United States Patent [19]

Borer et al.

[11] 4,174,203
[45] Nov. 13, 1979

[54] PROCESS AND DEVICE FOR THE PRODUCTION OF SUBMICRON-SIZED METALLIC OXIDES

[75] Inventors: Werner J. Borer, Henggart; Tomas Zuzak, Feuerthalen, both of Switzerland

[73] Assignee: Swiss Aluminium Ltd., Chippis, Switzerland

[21] Appl. No.: 821,559

[22] Filed: Aug. 3, 1977

Related U.S. Application Data

[63] Continuation-in-part of Ser. No. 755,136, Dec. 29, 1976, abandoned.

[30] Foreign Application Priority Data

May 5, 1976 [CH] Switzerland .................. 6465/76
Jul. 20, 1976 [DE] Fed. Rep. of Germany ....... 2632610

[51] Int. Cl.$^2$ ............................................ B01D 7/00
[52] U.S. Cl. .................................. 23/294 R; 250/325
[58] Field of Search .................... 250/325, 423 R; 423/617, DIG. 10; 23/293, 293 A, 294, 313 R, 313 PB

[56] References Cited

U.S. PATENT DOCUMENTS

| 2,862,792 | 12/1958 | Rehm | 23/294 |
| 3,330,623 | 7/1967 | Green | 23/313 |
| 3,524,496 | 8/1970 | Barnes | 23/294 |
| 3,533,756 | 10/1970 | Houseman | 23/294 |
| 3,764,272 | 10/1973 | Sterling | 23/294 |
| 3,923,467 | 12/1975 | Bonet et al. | 23/294 |

*Primary Examiner*—Hiram H. Bernstein
*Attorney, Agent, or Firm*—Bachman and LaPointe

[57] ABSTRACT

Submicron-sized oxide particles are produced in a process in which coarse particles are fed into a vaporizing zone of a plasma burner, where they sublimate and finer particles are produced in a cooling zone.

11 Claims, 2 Drawing Figures

PROCESS AND DEVICE FOR THE PRODUCTION OF SUBMICRON-SIZED METALLIC OXIDES

REFERENCES TO OTHER APPLICATIONS

This is a continuation-in-part application of application Ser. No. 755,136, filed on Dec. 29, 1976, and now abandoned.

BACKGROUND OF THE INVENTION

The invention relates to a process as well as an apparatus for the manufacture of flame-retardant oxide of sub-micron size, particularly antimony oxide, using a vaporization zone which is followed by a quenching zone.

U.S. Pat. No. 3,449,072 describes the production of a metallic oxide from the corresponding oxy-halide salt by oxidation of a halide; the reaction between the salt concerned, and oxygen takes place at a temperature which permits the oxide vapor to be cooled rapidly on leaving the vaporization zone.

This process, however, does not allow industrial scale production of finely divided solids in the form of submicron-sized particles, such as are required for filler materials in plastics and textiles.

In particular, antimony oxide, with a particle size of 0.2–5 microns and a specific surface area of 1–5 m$^2$/g, has been added for some time now as a flame-retarding agent to various plastics containing chlorides, especially to polyvinyl chloride. In spite of the fact that it is known that the flame-retarding effect is directly dependent on the surface area of antimony oxide particles present, it has not been possible up to now to produce economically, sufficiently fine powders in large quantities.

SUMMARY OF THE INVENTION

It is, therefore, an object of the present invention to develop a process and a suitable device for carrying out this process, so as to obviate the above disadvantages. In addition, it is another object of the present invention for the resultant ultra-fine powder to separate out dry and to form as free-flowing a heap as possible.

A process which fulfills these objectives is such that solid metallic oxide particles, of a particle size of 1–500 microns, preferably 1–100 microns, sublimate in the vaporization zone produced in a plasma stream, and submicronsized oxide particles, 0.02–0.5 microns in size, separate out and are then agglomerated. As a result, the surface area of the solid particles is increased by more than an order of magnitude, for example, by a factor of 10. This increase in surface area offers the significant advantage that the flame-retarding effect is either improved, or the same effect is achieved with much less antimony oxide.

According to another feature of the present invention the agglomerated oxide particles are transported by a stream of gas and then centrifuged.

The oxide particles are then transported by means of a gas stream through an apparatus including a plasma burner, an agglomerator, pressure-or suction-devices and an electric filter, a transport gas stream $\dot{V}_{TOT}$ being fed back at a controllable velocity when circulating, and in sequence from the agglomeration entrance through the agglomerator, the cyclone separator and back again to the agglomerator entrance, an additional gas stream $\dot{V}_1$ being added during agglomeration entry to the circulation, which additional gas stream corresponds in quantity to a gas stream $\dot{V}_2$ discharged from the electric filter.

The condensed oxide particles have a particle size between 0.02 to 0.5 microns at suitable operating parameters. In the agglomerator they are formed as larger, and relatively loose agglomerates, in which the particles are held together primarily by electrostatic forces. During a later or subsequent use of the oxide agglomerates, these agglomerates can be destroyed relatively easily.

The gas used for stabilizing the plasma flame, for example, argon, or the steam necessary for stabilizing the fluid employed, for example, water, is preferably used for transporting the submicron-sized particles. In the second case, that is when using steam as a gas for transporting the powder, it has been shown as advantageous to heat the apparatus prior to operation by means of a stream of steam to a temperature above the condensation point of the steam, and if necessary, to heat the cyclone collecting-silo permanently to obtain a dry powder.

The total gas-stream $\dot{V}_{TOT}$ circulating in the system is composed of a substantially constant gas stream $\dot{V}_K$ remaining in the circulation, and gas streams $\dot{V}_1$ and $\dot{V}_2$, added and discharged, respectively, from the electric filter, where $$\dot{V}_{TOT} = \dot{V}_K + \dot{V}_1 = \dot{V}_K + \dot{V}_2,$$

and where preferably $\dot{V}_K \cong 100\,\dot{V}_1$, or $\dot{V}_K$ is approximately equal to $100 \times \dot{V}_2$.

The gas stream $\dot{V}_1$ added to the circulation may be a stabilizing gas from the gas plasma burner, or steam of the stabilization liquid. In a further preferred implementation of the method and the apparatus according to the present invention, this gas stream $\dot{V}_1$ is subdivided into to partial streams $\dot{V}_{1'}$ and $\dot{V}_{1''}$ where $\dot{V}_{1'}$ is the stabilizing gas, or steam of the stabilizing liquid, and is fed from the plasma burner to the agglomeration entrance, and $V_{1''}$ is a gas additionally obtained from the outside, for example, air or argon, and is fed to the vaporization zone through an inlet conduit.

The primary particles condense in the zones of the plasma flame at a lower temperature and are of an order of magnitude which does not permit them to be precipitated, or separated out from the gas stream. They are therefore fed to the agglomerator by means of a transport gas stream ahead of the cyclone separator. A plurality of repeated passages through the agglomerator by means of the circulation system, according to the present invention, ensures that agglomerates of a size are obtained, which can subsequently be almost wholly separated out in the cyclone separator. In a further preferable embodiment of the invention, the agglomeration process is supported by a corona discharge at the entrance to the agglomerator. It has also been found particularly advantageous that material not separated out in the centrifuge or cyclone separator can be fed back to the vaporization zone with the carrier gas; as a result of this kind of recirculation during the production process itself, a yield of substantially 100% is achieved in practice.

The plasma gas rising from the plasma stream, as well as the gas stream $\dot{V}_2$, which gas streams contain at least some of the particles, are preferably filtered, and any particles remaining in the rising plasma gas stream as well as in the gas stream $\dot{V}_2$ are then returned to the vaporization zone.

A device or installation in terms of the invention includes a plasma furnace with at least one agglomerator connected to, and downstream thereof, which latter is in turn connected to a device for removing residual solids or particles from the gas stream. The particulate material which can be drawn off from this device is dry and flows easily.

The choice of the plasma flame stabilization, by means of liquid or gas, depends, amongst other factors, on the quantity of throughput of the system, and consequently of the required burner output. For burner outputs up to about 40 kilowatts, gas-stabilized burners have proven themselves effective, whereas for greater outputs, for example for outputs up to 500 kw, preferably fluid-stabilized plasma burners using, for example, a water or a water/methanol mixture, are used.

A cyclone separator is employed for separating the particulate material from the gas stream. This cyclone separator is connected to the plasma furnace by a pipe for recirculating the greater part of the carrier gas and which, together with the agglomerator, forms a circuit for recirculating the carrier gas. The cyclone separator preferably includes a silo, which may be operatively heated. This version of the device permits, for the first time, the above mentioned recirculation during the production process.

At least one pressure feed or suction feed device, for generating positive or suction pressure, respectively, is provided in the pipeline in order to ensure that this recirculation takes place.

In order to scrub gases which leave the device, the gases leave through an electrostatic filter. In accordance with the present invention this filter is provided with a device for discharging the residual solids separated out at this stage back into the plasma stream. According to another feature of the present invention, these finest of particles to be separated out in the electric filter may selectively be collected in a collection container following precipitation in the filter, or they may be added anew to the circulation, namely fed into the agglomerator. This second, or alternate method, namely recirculation, has the advantage that the concentration of solid particles in the transport gas is increased, and the agglomeration process therefore is hastened.

Due to this device, and the process which can be carried out thereby, submicron-sized material can now be produced with an active surface area which is five to ten times that of normal, or conventional material.

The method, according to the present invention, is particularly suitable for processing of metal oxides having an evaporation point up to approximately 2,200° C. Metal oxides having higher evaporation temperatures can also be processed, according to the present invention, but at lower throughputs at the same burner output.

Plastics containing antimony oxide treated in this manner have an exceptionally shiny surface compared to plastics containing the current, commercially available, fire-retardant antimony oxide.

The subsequent use of the submicron-sized antimony oxides leads to the prevention of the so called stiff hand or stiffness in textiles, and also prevents nozzle blockage in fibre manufacture. When using such submicron-sized metal oxide particles as flame-retarding additives in chloride-containing plastics, it has been shown that it confers the advantage of a progressively decreasing turbidity in transparent plastics having a decreased particle size, in addition to the advantage of an increased flame-retarding effect.

These are only a few of the exceptional advantages of the product manufactured by the process according to the present invention.

BRIEF DESCRIPTION OF THE DRAWING

Further advantages, features and details of the invention are revealed in the following description of an examplified embodiment and by means of two figures of the drawing in which.

DESCRIPTION OF THE PREFERRED EMBODIMENTS

Figure 1:
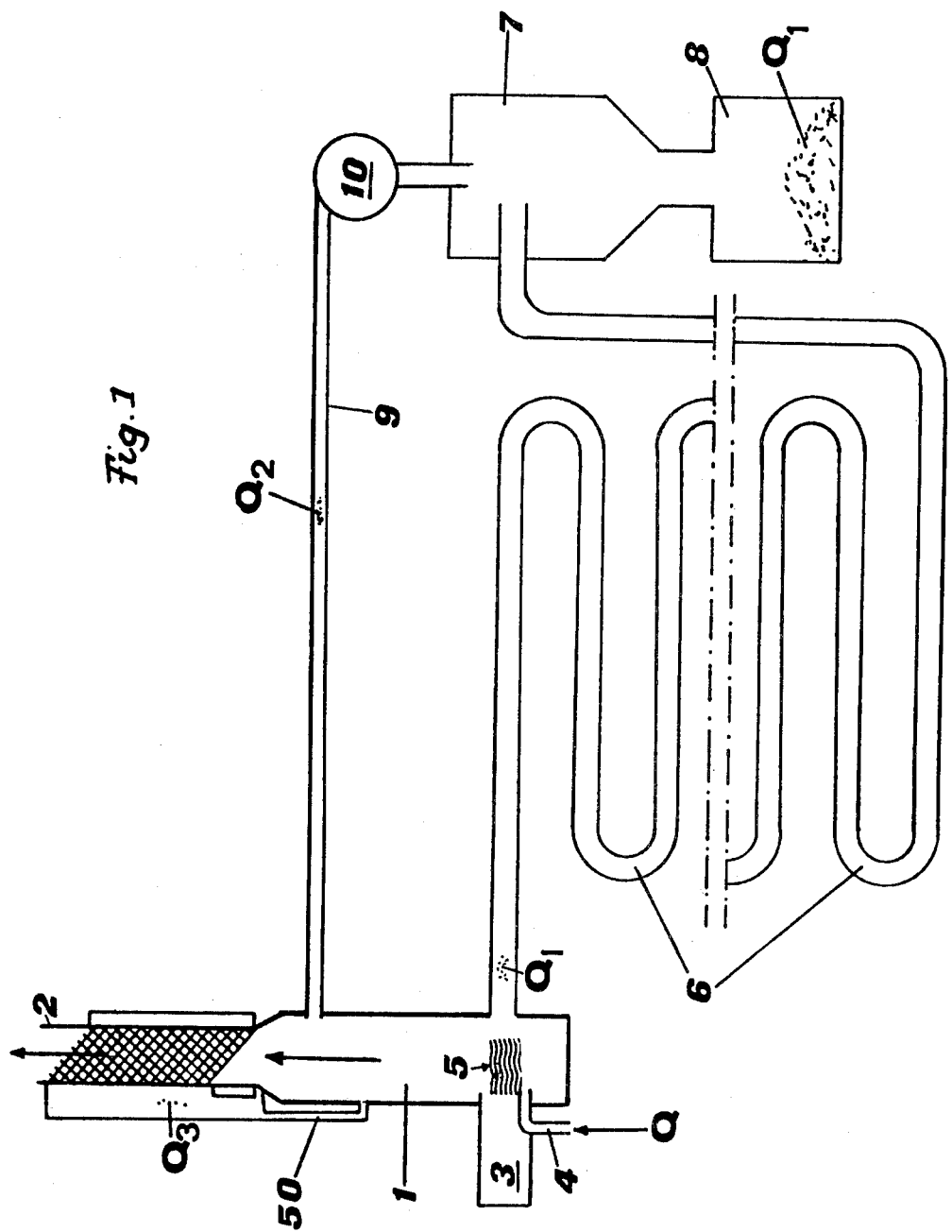
FIG. 1 shows a general schematic view of a first embodiment, according to the present invention.

Referring now to FIG. 1, a plasma furnace 1 is charged via a pipe 4 with antimony oxide powder Q in the region of its liquid-stabilized burner 3.

The antimony oxide powder Q sublimates in the plasma stream 5. The resultant submicron-sized antimony oxide $Q_1$ is fed dry to a cyclone separator 7 via an agglomerator 6.

The submicron-sized antimony oxide $Q_1$ which is precipated, is allowed to fall into a silo 8, whilst insufficiently agglomerated particles $Q_2$ are returned to the plasma furnace 1 via a pressure feed line 9, to be recirculated through the agglomerator 6. A fan 10 in the pipeline 9 causes the particles $Q_2$ to be transported through the system.

Figure 2:
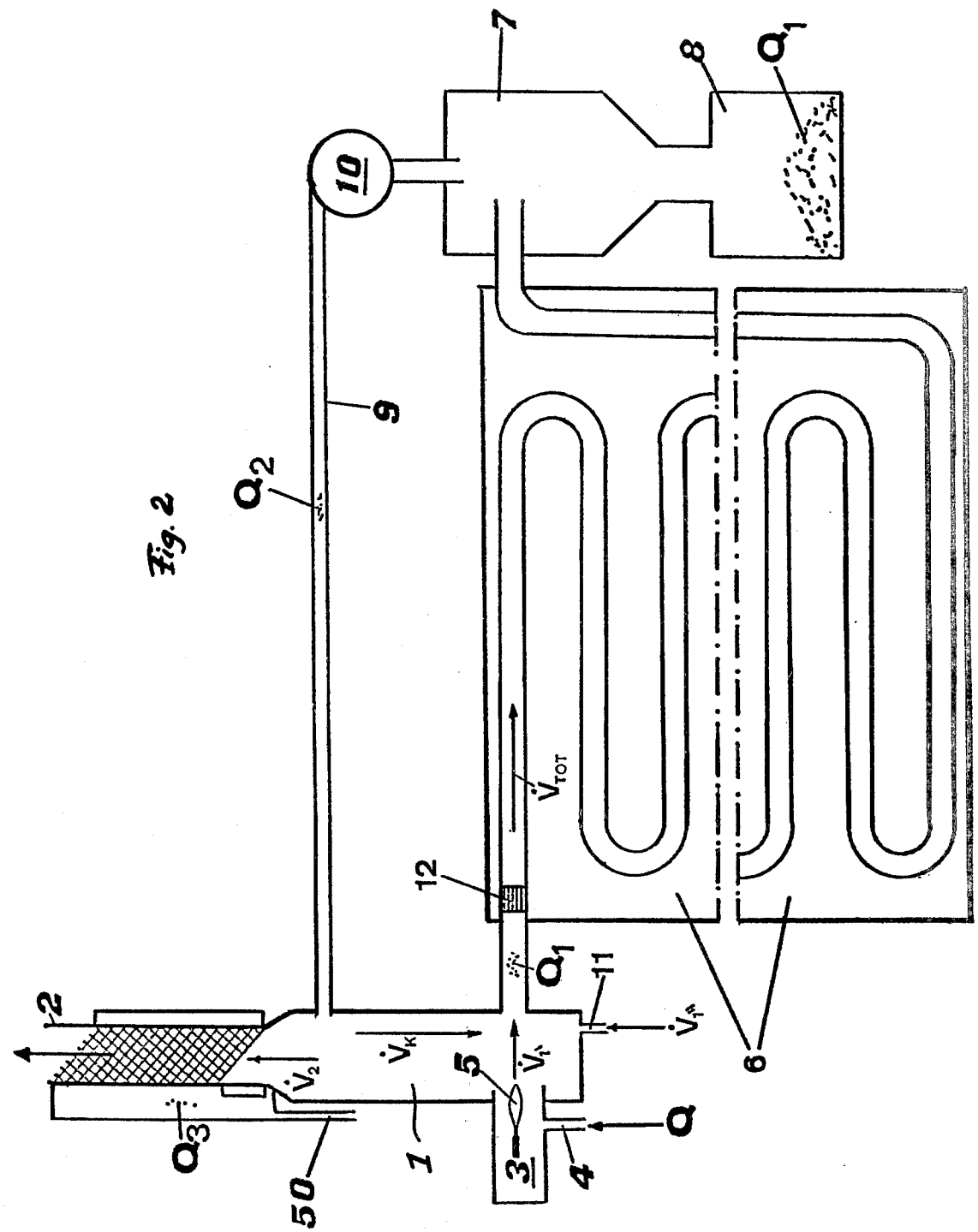
FIG. 2 shows a general schematic view of an alternate embodiment.

The schematic representation of an alternate apparatus, according to the present invention, is shown in FIG. 2, and consists of a plasma burner 3, an agglomerator 6, a cyclone separator 7 having a silo 8, a suction or conveying means 10, and an electric filter 2. The initial material in the form of a metal oxide powder Q is fed to the plasma flame 5 through the conduit 4, the oxide particles evaporating and condensing in zones of low temperature to submicron-sized particles of finest grain size $Q_1$.

An additional stream of gas $\dot{V}_1$, consisting of a stabilization gas stream $\dot{V}_{1'}$ and a additional gas stream $\dot{V}_{1''}$ which is additionally supplied via a conduit 11, is fed to the agglomerator 6 by means of the gas stream $\dot{V}_K$ and circulates in the direction of the arrow. This transport gas stream consisting of $\dot{V}_K$ and $\dot{V}_1$, transports the condensed submicron-sized particles of smallest size $Q_1$ to the agglomerator 6, a corona discharge apparatus 12 being disposed in the entry region thereof. The velocity of this stream may be controlled by conveying means 10. Articles of adequate size are precipitated in the cyclone separator 7 and are collected in the silo 8.

The transportation gas stream $\dot{V}_{TOT}$ still containing remnants of the finest particle sizes $Q_2$ is fed towards the direction of the electric filter 2 through the conduit 9 by means of the conveying means 10. A portion $\dot{V}_2$ of the transportation gas stream $\dot{V}_{TOT}$ is discharged by the electric filter 2 from the system, the discharged particles being either selectively fed by means of a conduit 50 to a non-illustrated collection chamber, or fed anew via a conduit 50, upon entry into the agglomerator 6, to the transportation gas system $\dot{V}_{TOT}$, or recirculated via the same conduit 50 to the plasma flame 5.

The operation of the apparatus, according to the present invention, will now be illustrated by means of two examples,

EXAMPLE 1

A trickling stream of 9.6 g/min of antimony oxide was evaporated in a plasma flame of a plasma formed by a gas stream of 36 l/per minute of argon at an output of 15 kw, resulting from the plasma discharge, and condensed in zones of lower temperature as submicron-sized material of finest corn size. A gas stream of 3,760 l/per minute, consisting of plasma gas (argon) and 4.2 l/per minute of additionally supplied air was used as transport gas.

The stream velocity in the agglomerator was 8 meters/per second, and the tube diameter of the agglomerator was 0.1 meter. The voltage applied to the electric filter was 10 kv. An output of 26 kw per hour per kilogram was obtained for the discharged material.

EXAMPLE 2

11.5 kilograms of $Sb_2O_3/h$ were fed to the plasma flame of a plasma burner stabilized by means of 5 kilograms of water per hour at an energy output of 150 kw due to the plasma discharge. A mixture of 8 liters per minute of air, and 8 liters per minute of argon, consisting primarily of water steam, was fed to the gas for powder transport. Using an agglomerator and an electric filter as in Example 1, the energy consumption per kilogram of the discharged material was 13 kw per hour per kilogram, the devices operating at otherwise equal parameters. The size of the particles, at ideal distribution of particle size, was between 0.01 and 0.35 microns.

Having thus described the invention, what I claim as new and desire to be secured by Letters Patent, is as follows:

1. A process for producing submicron-sized metallic oxide particles from particles having a size within a range of 1 to 100 microns in a vaporizing zone produced by a plasma stream, a zone being disposed downstream of said vaporizing zone and including an agglomerator having an entry region, a cyclone separator being connected in series with said agglomerator, the steps comprising:

sublimating said particles in said vaporizing zone, said particles having an initial size within a range of about 1 to 100 microns;

forming said submicron-sized particles having a size within the range of about 0.02 to 0.5 microns;

transporting said submicron-sized particles by means of a carrier gas to said agglomerator;

agglomerating said submicron-sized particles in said agglomerator so as to form loose agglomerates in which said submicron-sized particles are held together by electrostatic forces;

transporting said agglomerated submicron-sized particles by means of said carrier gas to said cyclone separator;

centrifuging said agglomerated submicron-sized particles in said cyclone separator so as to separate out at least a portion of said agglomerated submicron-sized particles from the fines of said agglomerated submicron-sized particles; and recirculating said fines of said agglomerated submicron-sized particles to said entry region of said agglomerator for further agglomeration.

2. A process according to claim 1 wherein an electric filter is disposed downstream of the vaporizing zone, and further comprising the steps of:

circulating at least a portion of the carrier gas at a controllable velocity in sequence from an entry region of said agglomerator to said cyclone separator, feeding back the circulating gas stream to said entry region, feeding a first stream of gas to said entry region, and discharging a second stream of gas from the electric filter, the volume of said first stream of gas corresponding to the volume of said second stream of gas.

3. A process according to claim 2 wherein the circulating gas stream has a volume exceeding the volume of said first stream of gas by a factor of at least 100.

4. A process according to claim 2 wherein said vaporization zone includes an inlet conduit and wherein said carrier gas includes a mixture of plasma gas and a third stream of gas, and further comprising the step of feeding said third stream of gas to said vaporization zone through said inlet conduit.

5. A process according to claim 1 further comprising the step of supporting the agglomeration of the submicron-sized particles by corona discharges within the entry region of said agglomerator.

6. A process according to claim 2 further comprising the steps of returning the remaining portion of said agglomerated particles to said vaporization zone.

7. A process according to claim 2, further comprising the steps of producing a fourth gas stream from said plasma stream, said second and fourth gas streams containing at least some of said particles, filtering said second and fourth gas streams, and returning the particles remaining from said second and fourth gas streams to said vaporization zone.

8. A process according to claim 2 further comprising the step of separating out the fines of said agglomerated submicron-sized particles in said electric filter, and collecting the separated submicron-sized particles in a container.

9. A process according to claim 8 further comprising the step of feeding the separated out submicron-sized particles to said entry region, and recirculating said separated submicron-sized particles.

10. A process according to claim 1 wherein said cyclone separator includes a silo, and further comprising the step of operatively heating said silo.

11. A process according to claim 1 wherein said submicron-sized particles are antimony oxide particles.

* * * * *